(12) United States Patent
Pestoni (10) Patent No.: US 7,249,155 B1
(45) Date of Patent: Jul. 24, 2007

(54) METHOD FOR PROCESSING A REQUEST TO MULTIPLE INSTANCES OF A SERVER PROGRAM

(75) Inventor: Florian Pestoni, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/500,921

(22) Filed: Feb. 9, 2000

(51) Int. Cl.
*G06F 15/16* (2006.01)

(52) U.S. Cl. .................. 709/203; 719/315; 719/330

(58) Field of Classification Search ............... 709/106, 709/107, 203, 232, 248, 329, 332, 205, 202, 709/250; 712/203, 206, 235, 246; 718/106, 718/107; 719/318, 320, 328, 331
See application file for complete search history.

(56) References Cited

U.S. PATENT DOCUMENTS

| | | | |
|---|---|---|---|
| 5,400,324 A | | 3/1995 | Eriksson et al. |
| 5,406,556 A | | 4/1995 | Widjaja et al. |
| 5,406,557 A | | 4/1995 | Baudoin |
| 5,581,706 A | * | 12/1996 | Jessup, Jr. et al. |
| 5,644,575 A | | 7/1997 | McDaniel |
| 5,712,901 A | | 1/1998 | Meermans |
| 5,726,640 A | | 3/1998 | Jones et al. |
| 5,774,467 A | | 6/1998 | Herrera Van Der Nood et al. |
| 5,802,368 A | * | 9/1998 | Grigsby et al. |
| 5,850,517 A | | 12/1998 | Verkler et al. |
| 5,898,834 A | * | 4/1999 | Sharpe et al. |
| 5,948,054 A | | 9/1999 | Nielsen |
| 5,963,944 A | | 10/1999 | Adams |
| 5,974,441 A | | 10/1999 | Rogers et al. |
| 6,014,702 A | * | 1/2000 | King et al. |
| 6,044,369 A | * | 3/2000 | Black |
| 6,078,924 A | * | 6/2000 | Ainsbury et al. |
| 6,085,235 A | * | 7/2000 | Clarke, Jr. et al. |
| 6,094,655 A | * | 7/2000 | Rogers et al. ............... 709/203 |
| 6,115,040 A | * | 9/2000 | Bladow et al. ............. 709/203 |
| 6,119,118 A | * | 9/2000 | Kain, III et al. |
| 6,128,624 A | * | 10/2000 | Papierniak et al. |
| 6,145,001 A | * | 11/2000 | Scholl et al. |
| 6,154,765 A | * | 11/2000 | Hart |
| 6,199,116 B1 | * | 3/2001 | May et al. .................. 719/310 |
| 6,219,780 B1 | * | 4/2001 | Lipasti ....................... 712/215 |

(Continued)

OTHER PUBLICATIONS

Yizhong Fan, An Adaptive Multi-Agent Architecture for ProFusion Meta Search System, Nov. 1997, http://profusion.ittc.ukans.edu/,1-2.*

*Primary Examiner*—Andrew Caldwell
*Assistant Examiner*—Stephan Willett
(74) *Attorney, Agent, or Firm*—Gibb I.P. Law Firm, LLC; Edmund Mizumato, Esq.

(57) ABSTRACT

A structure and method for processing a one-to-one request from a client program to multiple instances of a server program over a protocol includes transferring the request from the client program to a multiplexor, generating a plurality of instances of the request using the multiplexor (wherein each of the instances of the request corresponds to a different instance of the server program), transferring the instances of the request from the multiplexor to the instances of the server program, transferring a plurality of responses from the instances of the server program to the multiplexor, converting the responses to a uniform response; and transferring the uniform response to the client program.

26 Claims, 5 Drawing Sheets

U.S. PATENT DOCUMENTS

| | | |
|---|---|---|
| 6,233,584 B1 * | 5/2001 | Purcell |
| 6,253,239 B1 * | 6/2001 | Shklar et al. |
| 6,256,771 B1 * | 7/2001 | O'Neil et al. |
| 6,260,050 B1 * | 7/2001 | Yost et al. .................. 709/232 |
| 6,260,068 B1 * | 7/2001 | Zalewski et al. ........... 709/226 |
| 6,269,393 B1 * | 7/2001 | Yost et al. |
| 6,295,530 B1 * | 9/2001 | Ritchie et al. |
| 6,338,065 B1 * | 1/2002 | Takahashi et al. |
| 6,338,086 B1 * | 1/2002 | Curtis et al. ................ 709/203 |
| 6,369,840 B1 * | 4/2002 | Barnett et al. |
| 6,385,644 B1 * | 5/2002 | Devine et al. |
| 6,442,564 B1 * | 8/2002 | Frey et al. ................... 709/203 |
| 6,457,172 B1 * | 9/2002 | Carmichael et al. ........ 717/141 |
| 6,470,386 B1 * | 10/2002 | Combar et al. |
| 6,473,407 B1 * | 10/2002 | Ditmer et al. |
| 6,529,939 B1 * | 3/2003 | Kraft .......................... 709/203 |
| 6,691,306 B1 * | 2/2004 | Cohen et al. ............... 717/139 |
| 6,728,866 B1 * | 4/2004 | Kahle et al. ................ 712/215 |

* cited by examiner

FIG.7

METHOD FOR PROCESSING A REQUEST TO MULTIPLE INSTANCES OF A SERVER PROGRAM

BACKGROUND OF THE INVENTION

1. Field of the Invention

The present invention generally relates to computer network systems and more particularly to a module which permits simultaneous communication between a client program and multiple server programs without requiring different protocols or different versions of client or server programs.

2. Description of the Related Art

Figures 1, 2A, 2B:
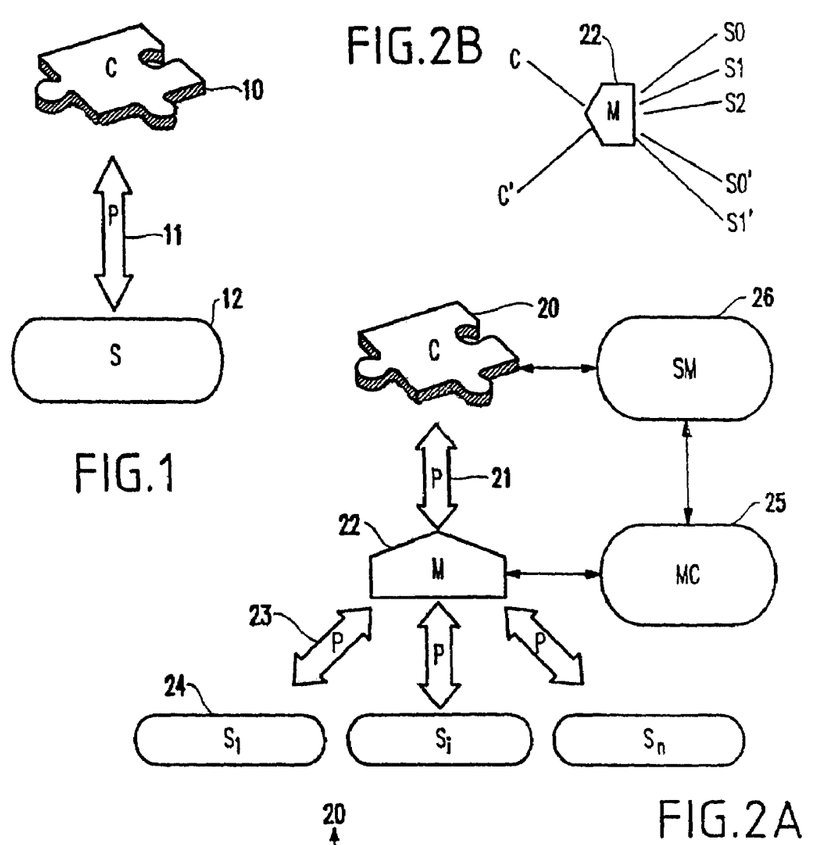
FIG. 1 is a schematic diagram of a one-to-one protocol.
FIG. 2A is a schematic diagram of the inventive multiplexor.
FIG. 2B is a schematic diagram illustrating the ability of the invention to operate with multiple instances of client and server programs.

To enable communication between program C (client program) and program S (server program), possibly running on different execution domains (processors), a protocol P is used. Using the protocol P, the client program C may send a request Rq to the server program S, and the server program S is expected to return a response Rp. This abstraction describes a large number of widely available protocols (e.g., HTTP (Hyper-Text Transfer Protocol), RPC (Remote Procedure Calls), RMI (Remote Method Invocation), etc.). This situation, in which a client program C 10 uses a protocol P 11 to communicate with a server program S 12, is shown in FIG. 1. The protocol P, in this situation, is a one-to-one, synchronous protocol.

However, it is not convenient (or even practical) if the same task is to be performed on two, ten or perhaps even hundreds of instances of the server program S (which conceivably could be running on an equal number of network-connected processors) over a one-to-one protocol P. Therefore, a broadcast or multicast protocol P' is used such a situation. Multicast and broadcast protocols distribute one message among a large number of nodes in a network and require a mechanism for handling multiple responses. In general, this is accomplished by modifying the client program C, server program S, or both, such that they work specifically with multicast protocol P'. Thus the conventional solution to permit such one-to-many situations requires modifying the client program C (and most likely the server program S) to use this protocol P' and handle the multiple responses it may receive.

SUMMARY OF THE INVENTION

It is, therefore, an object of the present invention to provide a structure and method for processing a one-to-one request from a client program to multiple instances of a server program over a protocol. The method includes transferring the request from the client program to a multiplexor, generating a plurality of instances of the request using the multiplexor (wherein each of the instances of the request corresponds to a different instance of the server program), transferring the instances of the request from the multiplexor to the instances of the server program, transferring a plurality of responses from the instances of the server program to the multiplexor, converting the responses to a uniform response; and transferring the uniform response to the client program.

The method specifies target instances of the server program to form a fan out target list, to which the request will be transferred. The converting comprises selecting an operation to combine the responses, such as listing the responses, aggregating the responses, adding the responses, preparing a subset of the responses, identifying a maximum of the responses, identifying a minimum of the responses, and averaging the responses.

The multiplexor automatically creates the instances of the request. The client program, the instances of the server program, and the protocol are unaffected by the method. The unified response has an instance corresponding to the client program.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

The invention includes a software "multiplexor" acts as an intermediary in the communications between one client program and multiple instances of a server program. The concept of multiplexing signals from one source to different destinations has been in use in the field of electronics and the invention derives its name from this electronic component by analogy.

As discussed above, with the conventional systems the client program, the protocol and/or the server programs are modified to allow a request from the client program to be issued to multiple instances of the server program. This process is very time consuming and expensive. The invention is fundamentally different because the invention only modifies the request (and the response to the request) to accommodate the different instances of the server program. By modifying only the request and the response, the invention avoids the need to modify the server program, client program or protocol. Further, because only the request and the response are modified, the process can be performed automatically using the inventive multiplex, which makes the request and response transparent (e.g., appear as a one-to-one communication) to the server and client programs.

A single client program C often needs to send the same request Rq to several instances of a server program S (Si) and process the responses Rpi obtained from each instance of the program Si. Each server Si is assumed to be executing the same program. However, the different instances of the server program Si have different data and/or states.

In computer science the term "program" refers to the implementation of an algorithm in a given programming language. A "process" refers to a program running on a computer. However, the two terms are often interchanged. For consistency and ease of understanding, the term "program" is used throughout the application. However, one ordinarily skilled in the art would understand whether a program or process was being performed, based on the context of the issue being discussed.

Conventionally, the client program C would have to be customized to accommodate each different instance of the server program Si. The inventive multiplexor M eliminates the need to customize the client program C and automates the communication without modification of the programs C or Si, or the protocol P.

The invention comprises a multiplexor M, with extensions to handle specific protocols. Further, the invention permits context-free operation under certain assumptions, allowing a single multiplexor handle communications between many pairs of C-S, C'-S', C"-S" that share the same protocol P, without any additional programming. As shown in FIG. 2B, the inventive multiplexor 22 can operate with different instances of the client program C, C' and different instances of the server program S0, S1, S2, S0', S1', etc., as well as operate with multiple instances of both programs simultaneously.

The invention can also be used in the one-to-one situations in which a single client program C uses a protocol P to communicate with a single server program S, as shown in FIG. 1.

The one-to-many case and the role of the inventive multiplexor is illustrated in FIG. 2A. In FIG. 2A, the client program C 20 can communicate with n instances of the server program $S_1$, $S_i$, $S_n$ 24 through the use of the multiplexor M 22 using protocol P 21. The multiplexor's client MC 25 supplies two additional inputs to the multiplexor, the fan-out and the operation op. The fan-out specifies the target servers from among all possible instances of the server program $S_i$ (from a possibly infinite number of instances), while the operation op determines how the results Rpi returned by each of the instances of the server program Si will be combined and made available to the client program C. The multiplexor uses this information to generate multiple instances of the request from the single original request sent by the client program. The servers will send back a response to the client program, either indicating an error condition or successful execution, possibly returning some data. These responses are then modified and combined by the multiplexor to correspond to the instance of the client program (e.g., to the same format, version, data structure, etc. of the original request) so that the client program believes it is talking to a single server program in a one-to-one communication environment.

Therefore, the multiplexor's client MC determines which instances of the server program S will receive the request from the client C. Additionally, the multiplexor's client MC determines how the responses from the different instances of the server program S will be combined. For example, the responses could be averaged, a minimum or maximum response could be found, all different responses could be listed, a subset of the responses could be prepared (based on some criteria supplied by the multiplexor's client), the responses could be aggregated (again based on a special aggregation formula supplied by the multiplexor's client), or the responses could be added together (e.g., totaled), depending upon the operation op.

Figure 3:
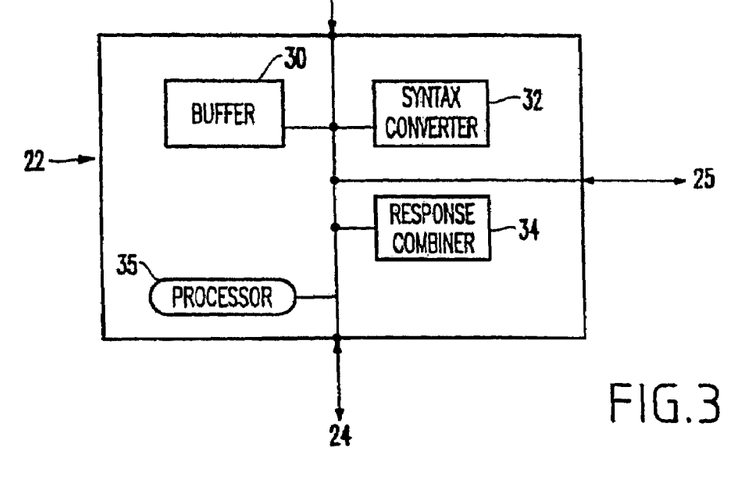
FIG. 3 is a schematic diagram of the inventive multiplexor.

FIG. 3 illustrates the inventive multiplexor in greater detail. More specifically, the multiplexor M 22 includes a buffer unit 30 which stores requests from the client 10 until the various instances of the server program 24 become available (e.g., come on-line) or until some other significant event takes place, such as a more convenient time of day when system usage is lower. In addition, the buffer 30 can store responses until all responses are received from the various instances of the server program 24. A syntax converter 32 similarly converts the request into a syntactically correct request for each given server program 24. A response combiner 34 acts under the instructions of the multiplexor's client 25 to combine the responses from the various instances of the server program 24. The response combiner 34 may utilize the syntax converter 32 to modify the responses received from the instances of the server program 24 back into a data format and syntax which is acceptable to the client program 20.

The multiplexor 22 accommodates multiple instances of a protocol by recognizing that there are some commonalties, i.e., some basic set of characteristics that are common to all protocols, such as the operations on results returned by servers, target selection and connection management, that need only be implemented once. Then, to implement different syntaxes and requirements of each protocol, the basic set of features is extended with protocol-specific functions (e.g., addressing, flow and error control, etc.). Because standard protocols are widely used, the extensions to the multiplexor to support one of these protocols can be leveraged across a large number of applications, i.e, for many pairs of the client-server programs C-S.

Thus, the invention allows the designers and developers to concentrate on the simpler, one-to-one protocol interaction and benefit from the generic facilities of the multiplexor.

All relevant protocols provide some mechanism for directing messages from a source to a destination, usually referred to as an "addressing scheme." This is reflected in the syntax of protocol messages, however the way in which the addressing scheme is implemented will vary from one protocol to another. Since the inventive multiplexor (which acts as an intermediary) redirects requests, the inventive multiplexors must modify the addressing information contained in the request originated by the clients and in the response returned by the server. Additional syntax conversion may be performed by the invention as required by specific protocols.

The following outlines the typical sequence of events that take place when the client communicates with several instances Si of the server program using the inventive multiplexor M.

First, the fan-out and operation op are selected by the multiplexor's client MC 25. For instance, the inventive multiplexor M22 may be integrated with a systems management program SM 26 (hereinafter sometimes referred to as system manager 26) that manages several remote servers.

Figure 4:
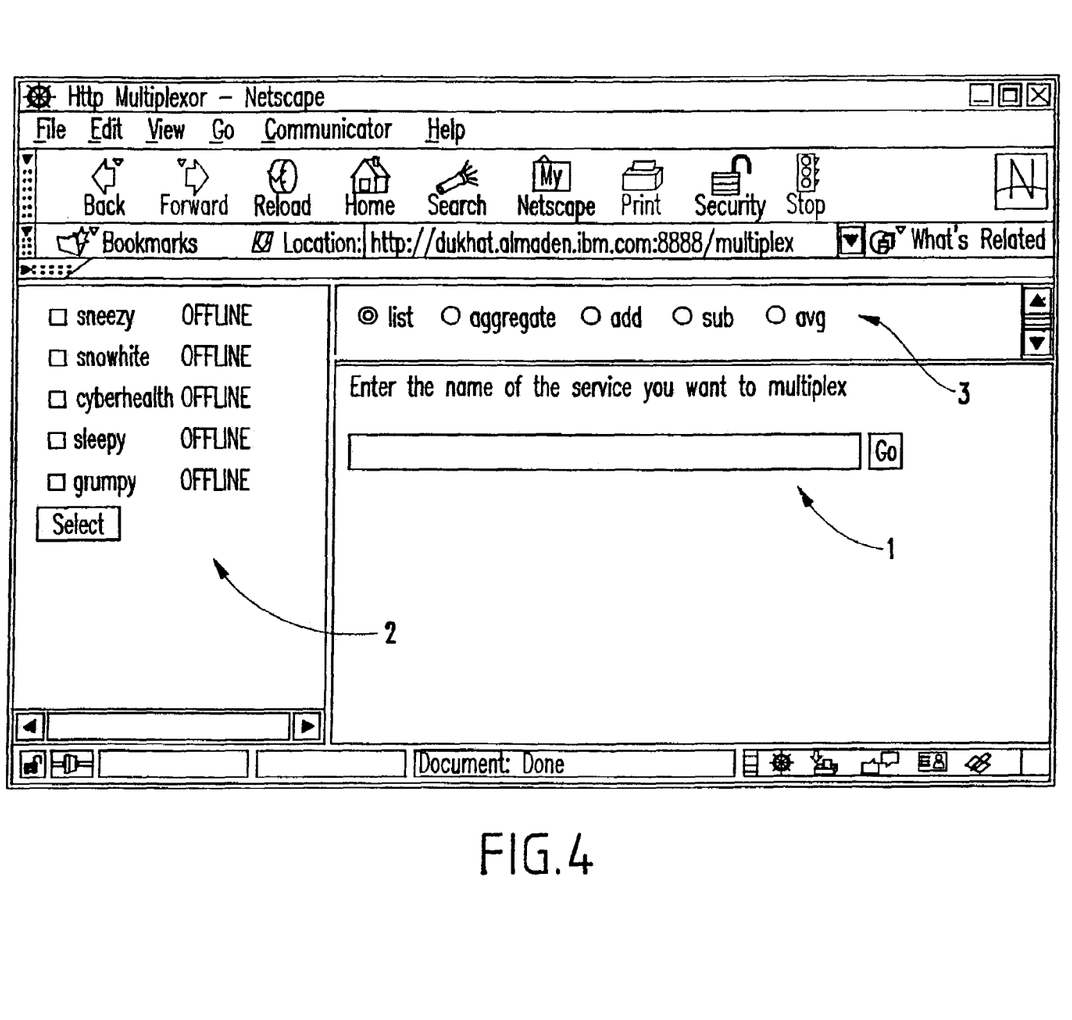
FIG. 4 is a web browser page illustrating the invention.
Figure 5:
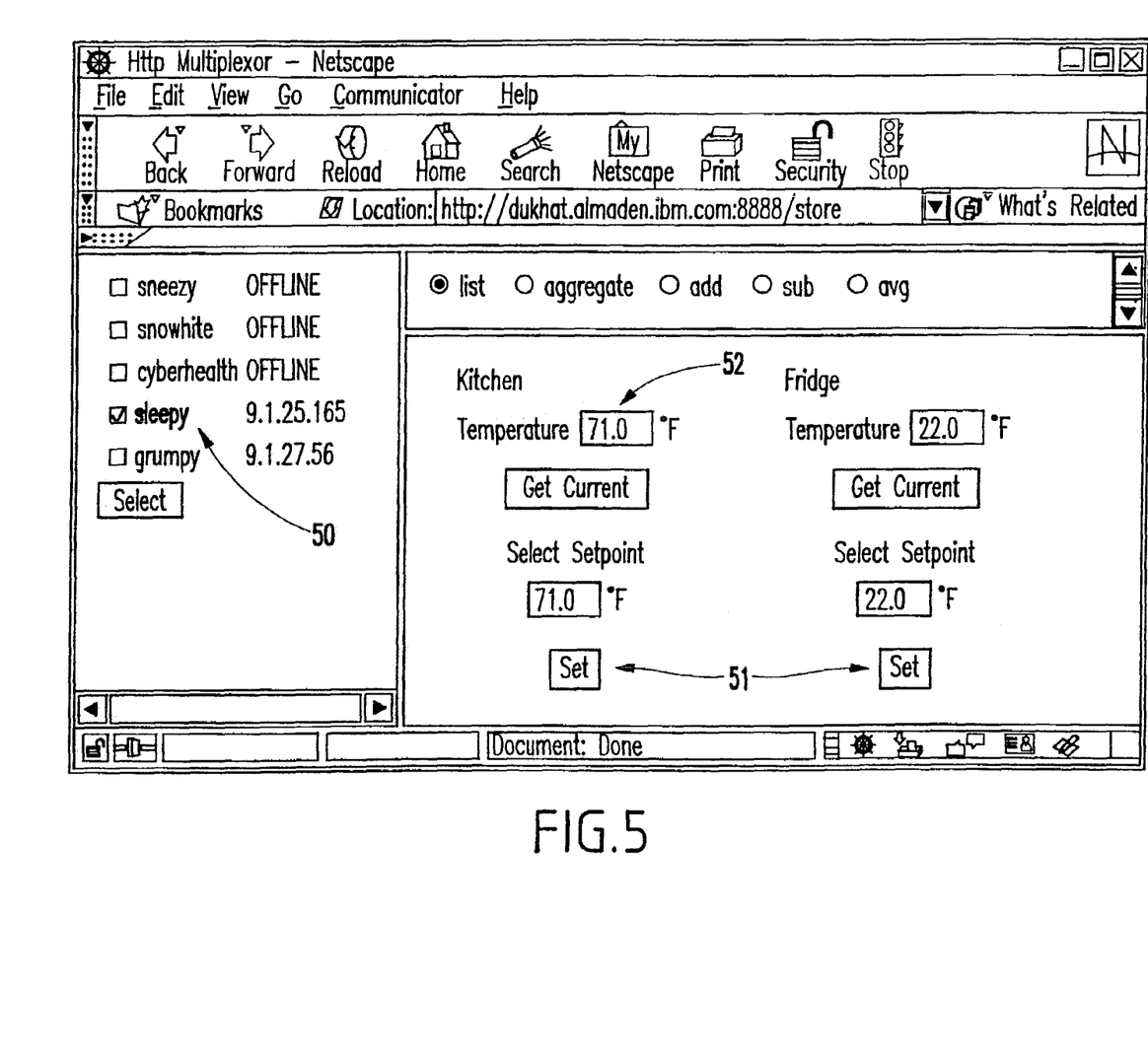
FIG. 5 is a web browser page illustrating the invention.
Figure 6:
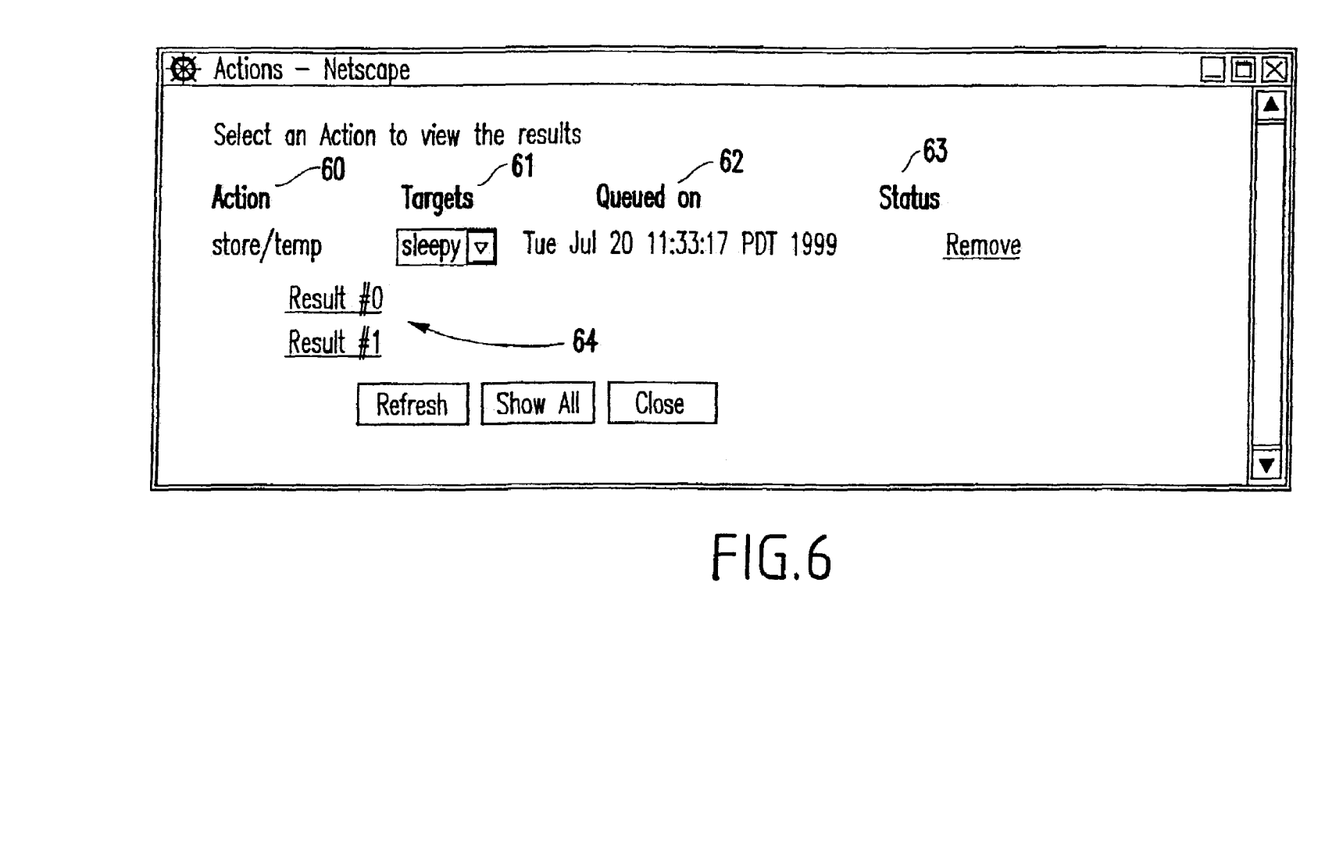
FIG. 6 is a web browser page illustrating the invention.

Also, the systems management program SM could provide a graphical user interface to the client program C (e.g., to the user) that depicts each server using an icon and/or groups of servers by some criteria such as location (as shown in FIGS. 4–6, discussed below). The user can select target servers to be added to the fan out list by clicking on their representation. The fan-out list is passed to the multiplexor's client MC and then to the multiplexor as a parameter. The op operation could be similarly selected by the user through the systems management program using the graphical user interface, as also discussed below. While this example provides that the client program C provides inputs to the system management program 26, the system management program can be controlled independently through a separate user interface (or by a separate network), as would be known by one ordinarily skilled in the art given this disclosure.

Servers with dynamic internet protocol (IP) addresses and sporadic connectivity may communicate with the system manager 26 to inform the system manager 26 when they become available (before they disconnect), as well as provide any dynamic information. Although the system manager 26 is not strictly part of the multiplexor (i.e. they can exist independently), both modules communicate in order for the multiplexor 22 to be able to send the actions to the targets 24. For example, a configurable agent can be used on the target servers. The agent will notify the connection manager when a dialed connection is established, and can also be manually triggered.

When results are available, they can be displayed using any graphical user interface (e.g., Web browser). The user interface is essentially the same as for the one-to-one case, but may represent a combination of the data coming from multiple servers.

Second, the client program C sends a request Rq to the multiplexor M over the protocol P 21. In order to do this, the multiplexor M must accept the same requests that an instance of the server program S would. This, in most cases, is implementation-specific. The syntax converter 32 modifies the request from the client program 20 in different ways so that each of the different instances of the server programs 24 view the request as a one-to-one communication from an individual client program C. Therefore, with the invention, it appears to each different instance of the server program 24 that the request is coming directly from the client server 20 and not from the multiplexor 22. Thus, the invention permits the client program 20 to send a request to multiple instances of a server program 24 without modifying the client program 20, the server programs 24, or the protocols 21, 23.

The sophistication of the syntax converter 32 and the characteristics of the specific protocol P affect the degree to which the multiplexor 22 can be automatically initiated to handle arbitrary instances of the server programs 24. For example, when the invention is used with the RMI and HTTP protocols very little or no customization is required to handle each specific server program because the protocols provide enough information for the inventive syntax converter 32 to automatically extract the necessary elements (e.g., addressing as described above) to re-route the requests and combine the responses.

When unusual protocols and/or instances of the server program are encountered (and even if the source code for a server program is not available) the inventive multiplexor can still create the modified requests by observing the format of messages accepted by the target servers. This requires no semantic interpretation of messages, just syntactic compatibility. This makes it possible to develop context-free multiplexors.

Next, from the fan-out list, the multiplexor M identifies all targets instances of the server program Si through Sn. Then, for each server program Si, the multiplexor M sends the same request Rq that it received from the client program C, using protocol P. Once again, it appears to the instances of the server program Si receiving the request Rq that the request comes from an instance of the client program C.

The Protocol P is assumed to be shared by all nodes of the network, and is assumed to handle only one-to-one communications. As described above, from the point of view of the server programs, the multiplexor creates "virtual" instances of the client program C by modifying the request. Conceptually, an infinite number of simultaneous connections could be supported.

Each server program Si processes the request and returns a response Rpi to the multiplexor M, which stores the response Rpi in the buffer 30. Once all responses Rp1 . . . Rpn have been received, the multiplexor 22 uses the processor 35 to apply the operation op to the response list. The product of the operation is a result set with k elements. If k equals 1 (only one element resulted from applying op to the response list), the multiplexor 22 sends this result as response Rp* to the client program 20. If k is greater than 1, an external mechanism, such as the graphical user interface discussed below, is employed to allow C to illustrate the list of results Rp1* . . . Rpk*.

FIGS. 4–6 illustrates one embodiment of the invention which provides temperature information from various sources (target instances of the server program). The example shown in FIGS. 4–6 is simplified to aid in the understanding of the invention. As would be known by one ordinarily skilled in the art given this disclosure, the invention is not limited to temperature information systems, but instead is applicable to all types of computerized network systems which record, maintain and process information for any purpose. More specifically, in the example shown in FIGS. 4–6, each server program includes information from one or more temperature sensors located in different locations/fixtures in a site, for example a store or warehouse. Each target server could represent a different floor or heating/cooling zone of a large building. Each zone could have multiple temperature sensors and multiple set points. Each of the server programs could utilize different instances of the same program and share the same protocol. However, in this example is assumed that the client program and server program are only capable of communicating on a one-to-one basis. Conceptually, this example allows one client program to process a one-to-one request through the inventive multiplexor to each of the different instances of the server program to return and control temperature information corresponding to multiple locations.

In this example, when a new value for a set point is selected by the user (e.g., a request by the client program), the temperature slowly changes from its current value until it reaches the desired set point. To read the current temperature, the user can click on a button to query the server (another request). This follows the situation described above in which only a one-to-one protocol is available and a one-to-many capability desired.

FIGS. 4–6, are illustrated using a commercially available Web Browser (e.g., Netscape Navigator available from Netscape Communications, Inc., Palo Alto, Calif., USA). However, any such graphical user interface could be used.

In this example, the multiplexor behaves as a Web server, thus allowing users to connect to it with a Web browser. FIG. 4 illustrates a list of potential instances of the server program (e.g., sneezy, snowhite, cyberhealth, sleepy, grumpy, etc.) as item 2. The user would create the fan out list by checking one or more of the instances of the server program 2. In addition, item 3 in FIG. 4 illustrates the check fields by which the user may select the operation op (e.g., list, aggregate, add, subtract, average, etc.) which is to be performed on the responses returned from the instances of the server program. Item 1 in FIG. 4 is an entry field for the name of the service (e.g., a specific functionality provided by all server instances that can be queried by sending a request Rq) that is to be multiplexed. In other words, the user would identify the server program in item number 1 of FIG. 4.

FIG. 5 illustrates a more customized page which displays current temperature and set points for two zones. While, in FIG. 4, the server program could be selected by completing the input box 1, in FIG. 5 the server program is not a variable and is set as a temperature management program.

On the page shown in FIG. 5, by typing a new value and clicking on the "Set" button 51, a new set point can be selected for either of two different items (e.g., kitchen room temperature and refrigerator temperature). In this example it is assumed that the server programs for the kitchen and refrigerator are different instances of the same server program. To view how the change in the set point affects the current temperature, the user can click on "get current" and the page is repainted with the latest value 52.

This user interface provides a way to select the server application to be multiplexed 1, as well as the targets 2, 50 and operations 3. The multiplexor serves static pages (i.e. pages that are common to all instances of the server program for the same relative universal resource locator (URL)) from a local repository and manages requests for dynamic pages by queuing them and forwarding these requests to the servers according to some policy, e.g. immediately if all servers are online, as they become available, or at a scheduled time.

A request, generically called an "action", is saved if at least one of the targets 50 is not available. As shown in FIG. 6, the invention can present the user with a list of similar actions 60 previously queued (or just the current one if it is the only one), including information about targets 61, the point in time when it was queued 62, and the current status (pending, ready, sent, etc.) 63. The user is given the option of either removing the action or queuing it to be processed as the targets become available. The user may select from the available results, and view results 64.

With the invention, for instance, the user could modify the set point 51 for this target (e.g., sleepy) 50 and click the "Set" button, thus sending the new request directly to that target. In fact, since the server "sleepy" is still online, it would receive the request immediately, and the display would be updated with the real time result.

To the contrary, the conventional systems would require modification of one or both target server programs (e.g., the kitchen temperature monitoring program and/or the refrigerator monitoring program) in order to allow such communication. In this example at least two servers are selected from the fan-out list. As shown in element 64 in FIG. 6 there are two results, which indicates that at least two targets had been selected. The names of these servers would appear in the drop down list labeled "Targets". All servers (sleepy, grumpy, etc.) have information regarding kitchen and refrigerator, but each one corresponds to a different store or location.

Figure 7:
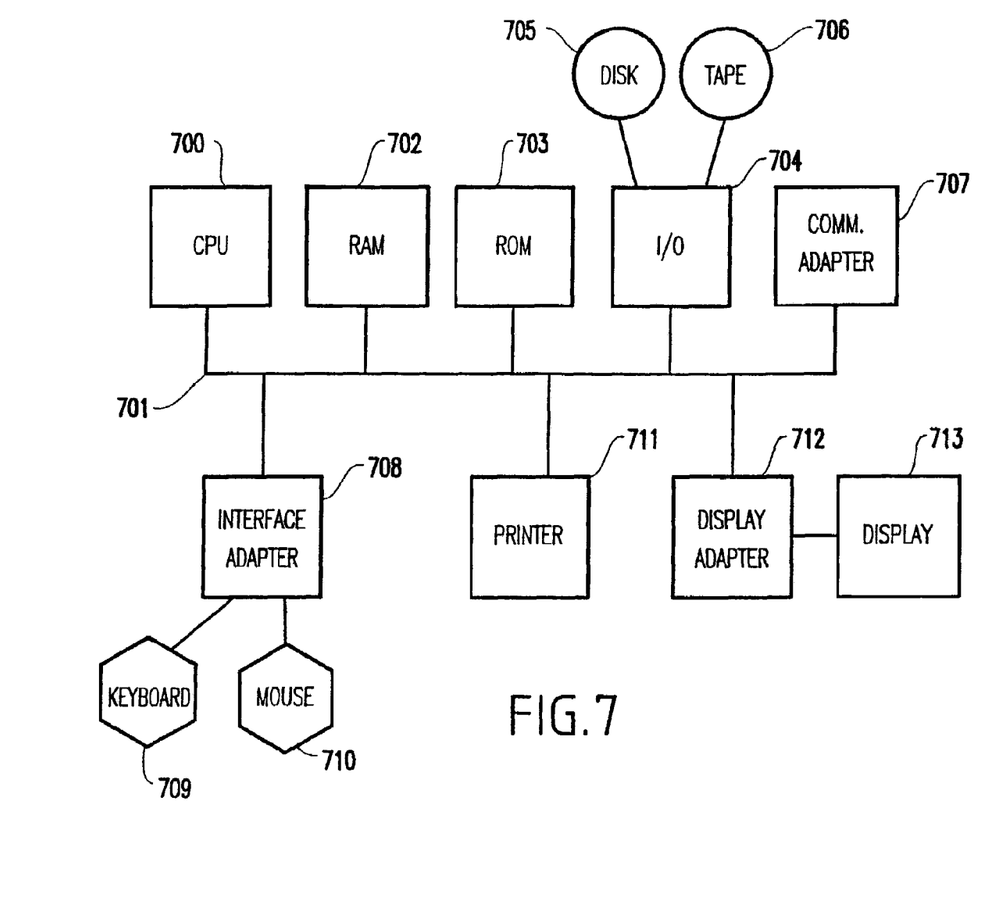
FIG. 7 is a hardware embodiment of the invention.

While the overall methodology of the invention is described above, the invention can be embodied in any number of different types of systems and executed in any number of different ways, as would be known by one ordinarily skilled in the art, given this disclosure. For example, as illustrated in FIG. 7, a typical hardware configuration of an information handling/computer system in accordance with the invention preferably has at least one processor or central processing unit (CPU) 700. For example, the central processing unit 700 could include various request processing units, mapping units, weighting units, adders, subtractors, comparators, etc. Alternatively, as would be known by one ordinarily skilled in the art given this disclosure, multiple specialized CPU's (or other similar individual functional units) could perform the same processing, mapping, weighting, adding, subtracting, comparing, etc.

The CPU 700 is interconnected via a system bus 701 to a random access memory (RAM) 702, read-only memory (ROM) 703, input/output (I/O) adapter 704 (for connecting peripheral devices such as disk units 705 and tape drives 706 to the bus 701), communication adapter 707 (for connecting an information handling system to a data processing network) user interface adapter 708 (for connecting a peripherals 709, 710 such as a keyboard, mouse, microphone speaker and/or other user interface device to the bus 701), a printer 712, and display adapter 713 (for connecting the bus 701 to a display device 714). The invention could be implemented using the structure shown in FIG. 6 by including the inventive method within a computer program stored on the storage device 705. Such a computer program would act on information supplied through the interface units 709, 710 or through the network connection 707. The system would then automatically produce the final desired product on the display 714, through the printer 712 or back to the network 707.

The degree of transparency that can be achieved with the invention depends greatly on the specific technology used to implement client program C, including the choice of protocol P. For example, a client program C having a graphical user interface implemented using object-oriented concepts known as component model (such as systems implemented using the Java programming language and the JavaBeans specification, available from Sun Microsystems, Palo Alto, Calif., USA) may generate a component that can be included within other components. In a preferred embodiment, JavaBeans is used to encapsulate client C within a generic container that communicates with the multiplexor to iterate through the result set. Note that the invention can be advantageously used as a tool for the design of systems with certain characteristics.

The inventive multiplexor is similar to a proxy in that it appears to C as an instance of S, and at the same time appears to S as an instance of C. However, a major difference is that M establishes multiple connections 24 for each request, whereas a proxy only establishes a connection with a single target.

Additionally, the inventive multiplexor may also encapsulate the complexity of communicating over sporadic connections (i.e., in systems in which not all Si may be online at the time C sends a request). The invention is strictly independent of the programs C, S and the protocol P. By providing a building block with the buffer functionality, the development of applications that involve sporadic connections is greatly simplified with the invention.

As mentioned above, in the situation that involves sporadic connections, the target servers may not (all) be online at the time when the client attempts to send a request. The inventive multiplexor reduces the complexity of supporting this type of connection by storing requests in the buffer 30, dispatching requests as the target servers come online and storing the responses in the buffer 30 until all targets have been contacted. The operation op can then be applied and the resulting data (set) presented to the client program 20.

The invention uses a different approach than that used conventionally, which enables the use of the existing programs C and S, as well as protocol P, without modification, while accomplishing the goal of communicating with several instance of program Si. The invention can be exploited in different development situations, (e.g., to enable existing applications, or to provide a modular design for new applications).

If an application exists that cannot be modified in a cost-effective manner (e.g., because the source code or development skills used in the original application are no longer available, because of deployment and software distribution issues, or because of the need for backward compatibility), under certain conditions the inventive multiplexor can be used to transparently enhance the functionality so that multiple targets can be addressed simultaneously.

In the case in which a new application is being developed, the invention can be used as a building block for modular design. Thus, with the invention, several applications (multiple servers) can share a client program. Some standard protocols can then be commonly used to develop these applications. By providing support for these protocols, the inventive multiplexor can be used as a building block.

The multiplexor is geared at communications between one client program C and multiple instances of the same server program S running on multiple execution domains (e.g. nodes on a network). In general, programs C and S are built to work together by supporting a number of shared message types. A common design has servers maintaining state or store data, and clients retrieve this data on demand by sending a request Rq, usually in response to user actions. While the same server program S can be instantiated (run) on several execution domains, the data that each instance of the server program Si holds may be different and the response Rpi that each of the instances of the server program Si sends to the client program C may thus be different.

The invention adapts existing, one-to-one client/server programs to handle one-to-many communications transparently, without a need to modify the original software by modifying the request. This is extremely important as conventional applications are pushed beyond the limits of their originally intended use. The invention can be used as a building block in the development of new systems. By offloading the complexity of managing multicast communications, the invention allows developers to concentrate on the specific requirements of the system being developed, resulting in significant cost and time savings.

By concentrating the functionality in one module, maintenance of the system (including debugging, extensions, etc.) can achieve economies of scale, since an enhancement can be leveraged by many systems.

The power of the inventive multiplexor is that it provides an almost transparent way to take a one-to-one protocol between a client and a server and extend it to multiple servers. For applications built from scratch, it reduces the development effort by enabling the programmers to concentrate on how to handle the simpler case of one client-one server. In the case of legacy applications (defined not in terms of the technology they use, but rather as those that are very costly to modify) that only handle one-to-one communication, the use of a multiplexor makes it possible to manage multiple connections in a manner transparent to the application.

The invention is especially applicable to networked embedded systems, in which a very large number of essentially identical devices interact over computer networks in complex ways. Internet-based applications such as electronic commerce may also benefit from the invention by giving users the possibility of richer interactions without significant development effort. Traditional client/server applications can be re-deployed in a distributed fashion with the invention. The invention can also be used in the design of systems that do not involve network communications and is equally applicable to systems that require processing asynchronous, identical function calls and that combine results.

While the invention has been described in terms of preferred embodiments, those skilled in the art will recognize that the invention can be practiced with modification within the spirit and scope of the appended claims.

What is claimed is:

1. A method for processing the same request from a client program to multiple instances of the same server program over the same protocol, said method comprising:
    transferring said same request from said client program to an intermediary;
    generating a plurality of request instances of said same request using said intermediary, wherein each of said request instances of said same request corresponds to a different instance of said same server program, wherein different request instances have one of different data and different states;
    buffering said request instances of said same request until said instances of said same server program are available;
    transferring said request instances of said same request from said intermediary to said instances of said same server program over a computer network;
    transferring a plurality of responses from said instances of said same server program to said intermediary over said computer network;
    converting said responses to a uniform response; and
    transferring said uniform response to said client program;
    wherein said generating comprises supplying user input to a systems management program to form a fan out target list, wherein said fan out target list comprises target instances of said same server program to which said request instances of said same request will be transferred; passing said fan out target list to an intermediary client; and passing said fan out target list from said intermediary client to said intermediary,
    wherein said target instances comprise at least one of information sources and information destinations, and
    wherein said client program, said same server program and, said same protocol are not modified by said method.

2. The method in claim 1, wherein said converting comprises selecting an operation to combine said responses.

3. The method in claim 2, wherein said operation comprises one of listing said responses, aggregating said responses, adding said responses, preparing a subset of said responses, identifying a maximum of said responses, identifying a minimum of said responses, and averaging said responses.

4. The method in claim 1, wherein said intermediary automatically creates said request instances of said same request.

5. The method in claim 1, wherein said unified response has an instance corresponding to said client program.

6. A method of processing the same request from a client program to multiple instances of the same server program over the same protocol, said method comprising:
    modifying said same request to create multiple request instances of said same request, each of said request instances of said same request corresponding to a single instance of said same server program, wherein different request instances have one of different data and different states;
    buffering said request instances of said same request until said instances of said same server program are available;
    transferring said request instances of said same request to corresponding ones of said instances of said same server program over a computer network;
    modifying and combining responses to said same request from said instances of said same server program to create a unified response; and wherein said modifying of said same request comprises receiving, by said client program, user input; forming, by a systems management program, a fan out target list based on said user input, wherein said fan out target list comprises target instances of said same server program to which said request instances of said same request will be transferred; passing said fan out target list to an intermediary client; and passing said fan out target list from said intermediary client to said intermediary, wherein said target instances comprise at least one of information sources and information destinations, and wherein said client program, said same server program, and said same protocol are not modified by said method.

7. The method in claim 6, wherein an intermediary alters said same request to comply with each instance of said same server program.

8. The method in claim 7, wherein said intermediary automatically creates said request instances of said same request.

9. The method in claim 6, wherein said converting comprises selecting an operation to combine said responses.

10. The method in claim 9, wherein said operation comprises one of listing said responses, aggregating said responses, adding said responses, preparing a subset of said responses, identifying a maximum of said responses, identifying a minimum of said responses, and averaging said responses.

11. The method in claim 6, wherein said unified response has an instance corresponding to said client program.

12. A method of using a computer program to process the same request from a client program to multiple instances of the same server program over the same protocol, said method comprising:

using said computer program to transfer said same request from said client program to an intermediary;

using said computer program to generate a plurality of request instances of said same request using said intermediary, wherein each of said request instances of said same request corresponds to a different instance of said same server program, wherein different request instances have one of different data and different states;

using said computer program to buffer said request instances of said same request until said instances of said same server program are available;

using said computer program to transfer said request instances of said same request from said intermediary to said instances of said same server program over a computer network;

using said computer program to transfer a plurality of responses from said instances of said same server program to said intermediary over said computer network;

using said computer program to convert said responses to a uniform response; using said computer program to transfer said uniform response to said client program; and using said computer program to supply user input to a systems management program to form a fan out target list, wherein said fan out target list comprises target instances of said same server program to which said request instances of said same request will be transferred; pass said fan out target list to an intermediary client; and pass said fan out target list from said intermediary client to said intermediary, wherein said target instances comprise at least one of information sources and information destinations, and wherein said client program, said instances of said same server program, and said same protocol are not modified by said computer program.

13. The method in claim 12, wherein said using said computer program to convert comprises using said computer program to select an operation to combine said responses.

14. The method in claim 13, wherein said operation comprises one of listing said responses, aggregating said responses, adding said responses, preparing a subset of said responses, identifying a maximum of said responses, identifying a minimum of said responses, and averaging said responses.

15. The method in claim 12, wherein said intermediary automatically creates said request instances of said same request.

16. The method in claim 12, wherein said unified response has an instance corresponding to said client program.

17. A program storage device storing a computer readable medium embodying a program of instructions executable by a machine to perform a method for processing the same request from a client program to multiple instances of the same server program over the same protocol, said method comprising:

transferring said same request from said client program to an intermediary;

generating a plurality of request instances of said same request using said intermediary, wherein each of said request instances of said same request corresponds to a different instance of said same server program, wherein different request instances have one of different data and different states;

buffering said request instances of said same request until said instances of said same server program are available;

transferring said request instances of said same request from said intermediary to said instances of said same server program over a computer network;

transferring a plurality of responses from said instances of said same server program to said intermediary over said computer network;

converting said responses to a uniform response; and transferring said uniform response to said client program;

wherein said generating comprises specifying user input to a systems management program to form a fan out target list, wherein said fan out target list comprises target instances of said same server program to which said request instances of said same request will be transferred; passing said fan out target list to an intermediary client; and passing said fan out target list from said intermediary client to said intermediary, wherein said target instances comprise at least one of information sources and information destinations, and wherein said client program, said instances of said same server program, and said same protocol are not modified by said method.

18. The program storage device in claim 17, wherein said converting comprises selecting an operation to combine said responses.

19. The program storage device in claim 18, wherein said operation comprises one of listing said responses, aggregating said responses, adding said responses, preparing a subset of said responses, identifying a maximum of said responses, identifying a minimum of said responses, and averaging said responses.

20. The program storage device in claim 17, wherein said intermediary automatically creates said request instances of said same request.

21. The program storage device in claim 17, wherein said unified response has an instance corresponding to said client program.

22. An intermediary comprising a computer readable medium for processing the same request from a client program to multiple instances of the same server program over the same protocol, said intermediary comprising:
- a converter for generating a plurality of request instances of said same request, wherein each of said request instances of said same request corresponds to a different instance of said same server program, wherein said converter is further adapted to receive, by said client program, user input; form, by a systems management program, a fan out target list based on said user input, wherein said fan out target list comprises target instances of said same server program to which said request instances of said same request will be transferred; pass said fan out target list to an intermediary client; and pass said fan out target list from said intermediary client to said intermediary, wherein different request instances have one of different data and different states;
- a buffer for buffering said request instances of said same request until said instances of said same server program are available; and
- a response combiner for converting responses received from multiple instances of said same server program over said computer network to a uniform response,
- wherein said target instances comprise at least one of information sources and information destinations, and
- wherein said client program, said same server program, and said same protocol are not modified by said intermediary.

23. The intermediary in claim 22, wherein said response combiner selects an operation to combine said responses.

24. The intermediary in claim 23, wherein said operation comprises one of listing said responses, aggregating said responses, adding said responses, preparing a subset of said responses, identifying a maximum of said responses, identifying a minimum of said responses, and averaging said responses.

25. The intermediary in claim 22, wherein said converter automatically creates said request instances of said same request upon receipt of said same request.

26. The intermediary in claim 22, wherein said unified response has an instance corresponding to said client program.

* * * * *